Sept. 24, 1968  HIROSHI HIGUCHI  3,403,273
SELF-STARTING SYNCHRONOUS MOTOR
Filed Dec. 13, 1965  3 Sheets-Sheet 1

INVENTOR
Hiroshi Higuchi
BY *Wenderoth, Lind & Ponack*
ATTORNEYs

Sept. 24, 1968  HIROSHI HIGUCHI  3,403,273
SELF-STARTING SYNCHRONOUS MOTOR
Filed Dec. 13, 1965  3 Sheets-Sheet 2
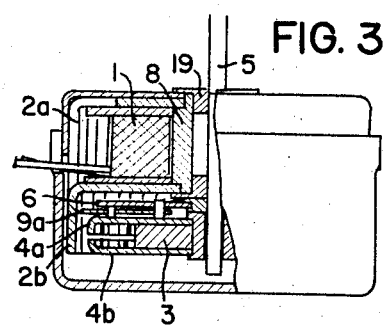
FIG. 3
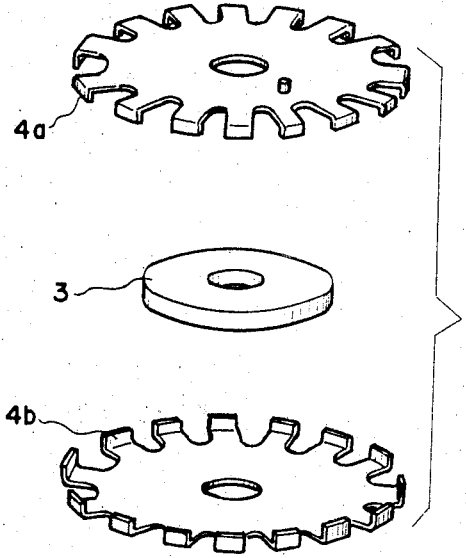
FIG. 2
FIG. 4
FIG. 5
FIG. 7
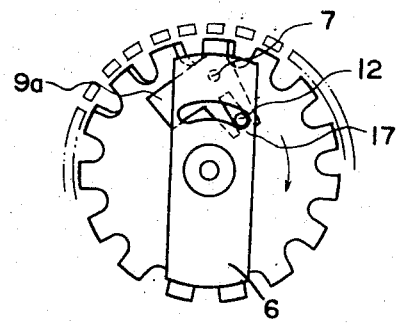
FIG. 6
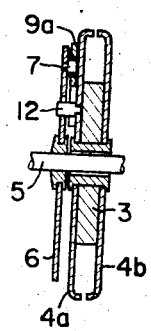
FIG. 8
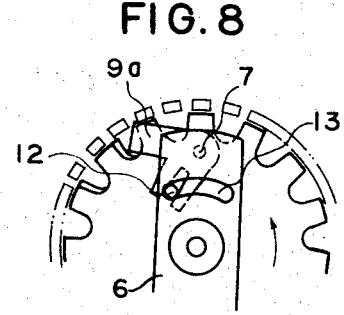
INVENTOR
Hiroshi Higuchi
BY Wenderoth, Lind & Ponack
ATTORNEYS Sept. 24, 1968  HIROSHI HIGUCHI  3,403,273
SELF-STARTING SYNCHRONOUS MOTOR
Filed Dec. 13, 1965  3 Sheets-Sheet 3
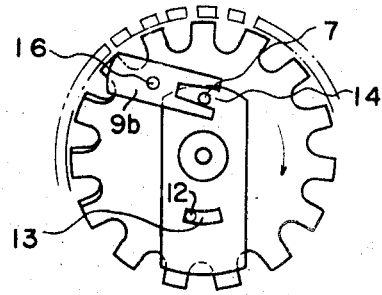
FIG.10
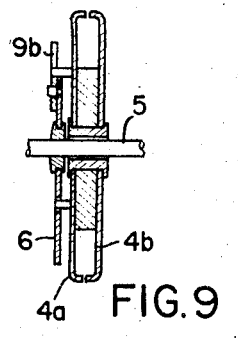
FIG.9
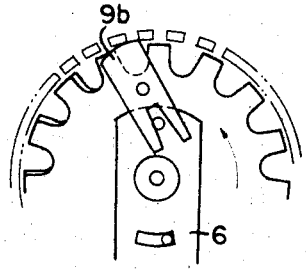
FIG.11
FIG.13
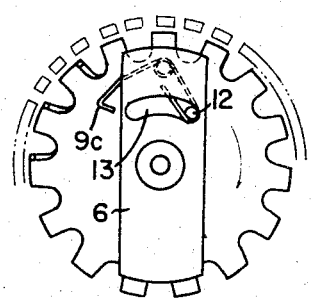
FIG.12
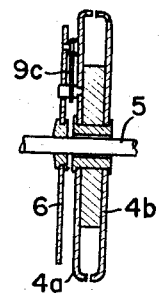
FIG.14
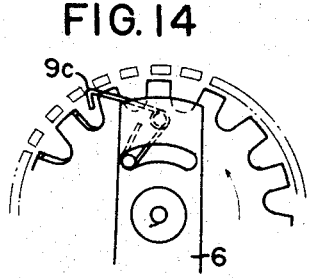
FIG.15
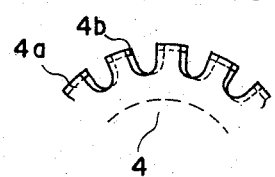
INVENTOR
Hiroshi Higuchi
BY Wenderoth, Lind & Ponack
ATTORNEYS

United States Patent Office 3,403,273
Patented Sept. 24, 1968

3,403,273
SELF-STARTING SYNCHRONOUS MOTOR
Hiroshi Higuchi, Yokosuka, Japan, assignor to Tanaka Instrument Company, Limited, Yono, Japan
Filed Dec. 13, 1965, Ser. No. 513,209
Claims priority, application Japan, Feb. 26, 1965, 40/14,653, 40/14,654
8 Claims. (Cl. 310—41)

ABSTRACT OF THE DISCLOSURE

An improved fractional horsepower synchronous motor which has a stator consisting of a field coil with a pair of pole plates each of which has a number of finger-like subpoles extending from the plate and perpendicular to the plane of the plate. The subpoles of one plate are longer than those of the other plate, and the longer end shorter subpoles alternate around the periphery of the stator. The rotor has an axially magnetized permanent disc magnet and a pair of pole plates having a number of subpoles around the periphery thereof, the pole plates being clamped to opposite sides of the disc magnet. The number of subpoles on the two plates is the same and the total number is the same as the number of subpoles of the stator. A coupling plate is provided between the stator and the rotor mounted on a shaft freely rotatable within the stator and rotor. Means are provided for coupling the coupling plate to the rotor so that the coupling plate will rotate in only one direction when the stator is energized.

---

This invention relates to synchronous motors, and more particularly, to unidirectional, self-starting fractional horsepower synchronous motors of the reaction type including direction controlling means.

The synchronous motor art has failed to develop a fractional horsepower motor having reliable unidirectional starting characteristics, low starting and running torque and uniform operating characteristics over a wide range of applications and temperature. In the past, there have been many kinds of synchronous motors having a revolving shaft provided with a toothed wheel mechanism. The construction of such motors, however, is so complicated and on such a relatively large scale that a very precise fabricating procedure together with a high manufacturing cost is required. In addition, the rotation of the above motor is accompanied by an inevitable noise resulting from the revolution of the toothed wheels. Moreover, there is a disadvantage that the miniaturization of such a synchronous motor is limited by the presence of toothed wheels, and therefore the field of practical applications will be restricted.

In reference to the synchronous motor having no toothed wheel, such a motor has been proposed which has a coil spring between the rotor and a coupling plate which operatively connects the rotating shaft with the rotor. In starting, the coil spring has to be wound up, then the rotor is set in rotation. Therefore, there is a defect in that the start of the synchronous motor is delayed, and further, the coil spring can be broken. Accordingly, the synchronous motor of this type often does not last for an extended period of time. It is not only inconvenient to use, but also difficult and expensive to manufacture. As described in the above, there have been several disadvantages to the conventional fractional horsepower synchronous motors.

The present invention seeks to overcome the above defects of small synchronous motors of the prior art and provide a superior fractional horsepower synchronous motor having reliable unidirectional starting characteristics, high starting speed, durability, low fabricating cost, and adaptability for mass production.

In accordance with a preferred embodiment of this invention, the motor was designed for 120 volt, 50–60 cycle alternating current and to operate at 200 r.p.m. on 50 cycle current with an intended power consumption of about 2 watts, about $\frac{1}{400}$ (one four hundredth) horsepower, current density 18 ma., and an overall diameter of about 27 mm. The limitations in connection with this preferred embodiment are not necessarily limitations on the invention of which this embodiment is only illustrative.

The fractional horsepower synchronous motor constructed according to this invention comprises a stator consisting of a field coil having a pair of pole plates on either side, a rotor consisting of an axially magnetized disc-shaped permanent magnet having a pair of pole plates on either side, and a specially designed direction controlling means in the form of a claw, wherein said direction controlling means is pivotally mounted in the narrow space between the stator and rotor.

In reference to the rotor, it is to be noted that a rotating shaft is not secured to the rotor in the central aperture thereof, which is one of the features of this invention. The rotating shaft is not secured to the rotor, but is secured to a coupling plate. It will be described in detail hereinafter.

It is known that a synchronous motor is rotated in either direction, clockwise or counterclockwise, on energization thereof so that a toothed wheel mechanism or coil spring referred to above is provided in order to cause it to rotate in a desired direction. The present invention is chiefly concerned with the direction controlling means, and more particularly, with a novel and improved direction controlling means.

Accordingly, it is a principal object of the invention to provide a novel and improved starting claw of simple construction which functions as an efficient direction controlling means adapted for synchronous motors, particularly for a fractional horsepower synchronous motor.

It is another object of the invention to provide a novel starting direction controlling means adapted for synchronous motors, whereby the miniaturization of the overall size of comparable synchronous motors of the same specifications and dimensions will be made possible without the sacrifice of the operating characteristics of the fractional horsepower synchronous motor now widely in use, and further, a substantial reduction in the manufacturing cost of motors of this type will also be made possible.

It is still another object of the invention to provide a novel and improved low cost fractional horsepower self-starting synchronous motor wherein a rotatable shaft is not secured directly to the rotor, but is rotatably mounted thereon, and the rotation of the rotor is transmitted to a coupling plate and then to a load outside the motor.

It is an additional object of the invention to provide a novel and improved permanent magnet rotor having a pair of opposed pole plates on either side adapted for a fractional horsepower synchronous motor wherein each of the pole plates has a number of notched subpoles on the periphery thereof, and in addition each pair of opposed subpoles is in staggered relation.

Further objects and advantages of the present invention will be apparent from the following description, reference being had to the acompanying drawings wherein a preferred embodiment including three forms of an essential component is clearly shown.

In the drawings:

FIG. 2 is an exploded perspective view showing the essential components of a permanent magnet rotor for use in the synchronous motor of this invention.

FIG. 3 is a side elevation view partly in section of the motor of FIG. 1 after assembly.

FIG. 4 is a perspective view of a second form of a starting claw, direction controlling means, in accordance with the invention.

FIG. 5 is a perspective view of a third form of the starting claw.

FIG. 6 is a sectional view showing the mounting of the starting claw 9a of FIG. 1.

FIG. 7 is a plan view showing the mechanism of the starting claw of FIG. 1 together with a coupling plate and rotation of a rotor in a clockwise direction.

FIG. 8 is a view similar to FIG. 7 showing how the counterclockwise rotation of the rotor is restricted.

FIG. 9 is a section showing the mounting of the starting claw 9b of FIG. 4.

FIG. 10 is a plan view showing the mechanism of the starting claw 9b of FIG. 4 together with the coupling plate and rotation of the rotor in the clockwise direction.

FIG. 11 is a view similar to FIG. 10, showing how the counterclockwise rotation of the rotor is prevented.

FIG. 12 is a section showing the mounting of the starting claw 9c of FIG. 5.

FIG. 13 is a plan view showing the mechanism of the starting claw 9c of FIG. 5 together with the coupling plate and rotation of the rotor in the clockwise direction.

FIG. 14 is a view similar to FIG. 13 showing how the counterclockwise rotation of the rotor is interrupted.

FIG. 15 is a partial plan view showing a pair of opposed subpoles of the pole plates of the rotor in a staggered relation.

Figure 1:
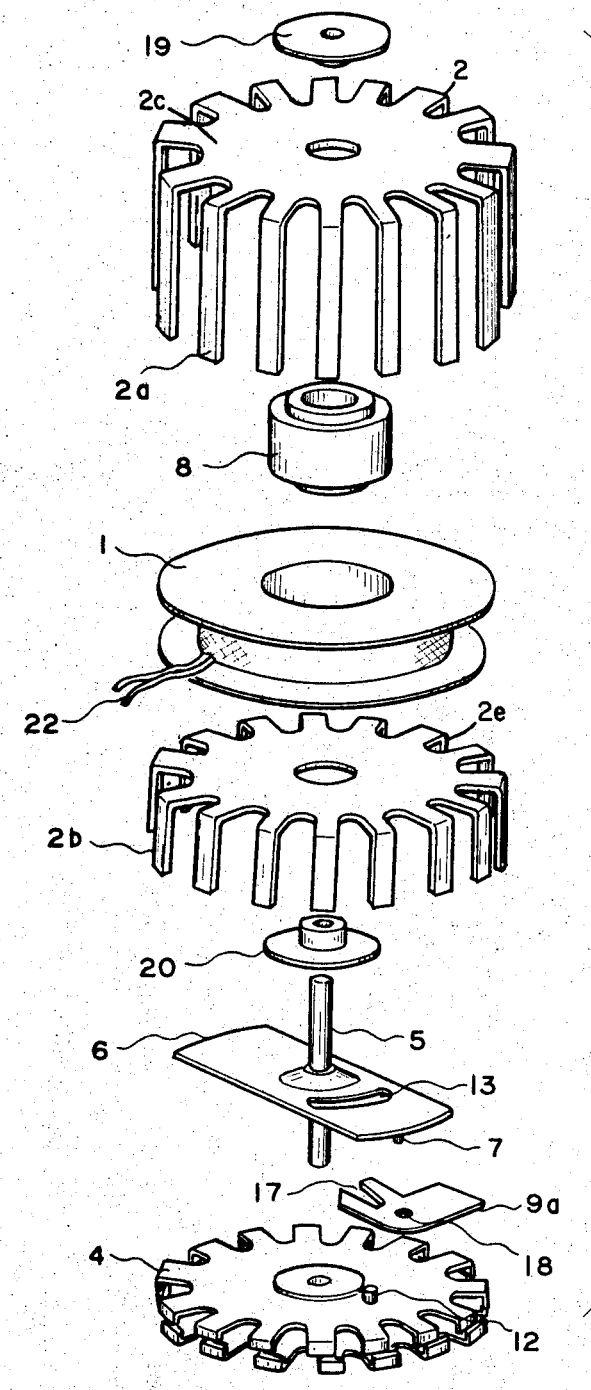
FIGURE 1 is an exploded perspective view showing the essential components of a synchronous motor of this invention and illustrating the relative positions of the components.

In FIG. 1 the uppermost member is end bearing 19. Immediately below the end bearing 19 is one of the stator plates 2 in the form of disc 2c of magnetically soft material, such as cold rolled steel or the like. An outer rim of magnetically soft material encircles the periphery of the stator pole plate, and a number of magnetically soft stator subpoles 2a extend from the periphery of the stator pole plate. All of the stator poles are formed out of the material at the periphery thereof when the remainder of that material is stamped out so as to leave radially extending fingers. These fingers are then bent substantially perpendicular to the plane of the material as shown. These fingers are preferably formed from the same sheet of material by means of a pressing or drawing operation.

Immediately below the stator pole plate 2 is a hollow iron core 8, and immediately below the hollow iron core 8 is a field coil 1 which is made up of a form of molded plastic having a central aperture. The coil is bobbin-wound on the form, the annular winding comprising, in this particular embodiment, about 7,000–10,000 turns of insulated copper wire 0.04 mm. in diameter. However, the number of turns of wire is illustrative only, and it is to be understood that the number of turns of wire depends upon the user's requirements.

Immediately below the coil 1 is the other pole plate 2e of the stator, one subpole 2b of which is shown. The number of subpoles 2b and their shape are almost the same on the poles 2a, but the length of subpoles 2a is longer than that of subpole 2b as shown. The stator consists of two groups of subpoles 2a and 2b having the field coil 1 therebetween. On energization of the coil 1, it is seen that the strength of each magnetic pole 2a is weaker than that of magnetic pole 2b, because the former are longer than the latter in length.

When the stator is assembled, each of the short subpoles 2b exists between and adjacent two long subpoles 2a, and further, the ends of subpoles 2a and 2b are even. In addition, the number of subpoles 2a is the same as that of subpoles 2b, and in this particular embodiment the number of respective subpoles is fifteen, that is, the total number of subpoles is thirty in all. In other words, the total number of poles of the stator of the synchronous motor is thirty. It is known that the speed of a synchronous motor is directly proportional to the line frequency and inversely proportional to the number of poles in the stator. Therefore, in this particular embodiment, the number of stator poles is selected to be 30 in order to utilize the above to the full. N (rotations per minute) of synchronous motors is given by the formula:

$$N = 120 f/p$$

In the above formula, $f$ is cycles per second, and $p$ the number of poles. For 50 cycles ($f=50$), N is 200 because there are 30 poles in this particular embodiment. 200 r.p.m. is a very low speed for a fractional horsepower synchronous motor of the type of this invention. Therefore, the motors having the above low speed are useful in a variety of drive systems such as, turntable drives, household clocks, timing instruments, stop clocks, elapsed-time indicators, repeat cycle timers, time-delay relays, and printed-circuit binary time encoders, etc.

As described above, the number of stator poles has been selected to be thirty in this preferred embodiment of this invention, but it is understood that the number of poles is illustrative only and not limited.

A rotatable shaft 5 is rotatably mounted in the central aperture of iron core 8. It is to be noted that the shaft 5 is not firmly secured to a rotor 4 and, in other words, the rotor 4 does not have its own shaft at the center thereof.

Immediately below the stator pole 2b is bearing 20 similar to bearing 19, both of which hold the iron core 8 in the central aperture of the field coil having a pair of pole plates clamped to opposite sides thereof.

Immediately below the bearing 20 is a coupling plate 6 secured to the shaft 5. The coupling plate 6 has an oblong form and is about 0.5 mm. thick, and it is preferred that it be large enough to be accommodated in the space within the long and short subpoles of the stator. The length of the coupling plate 6 should be a little shorter than the diameter of the rotor. The material of the coupling plate is preferably nonmagnetic, and in this particular embodiment it is made of brass or polycarbonate synthetic resin.

The shaft 5 of the coupling plate 6 is rotatably mounted in the central apertures of the rotor and the stator, respectively. The function of the coupling plate 6 is to engage with a direction controlling means 9a and transmit rotation caused by the rotor in a desired direction, either clockwise or counterclockwise, with the aid of the direction controlling means 9a, whereby a constant speed of the rotor in a constant direction can be transmitted to the shaft 5 of the coupling plate 6. As described hereinabove, the shaft 5 is not secured to the rotor 4 at the central aperture thereof, hence the coupling plate 6 is required to transmit rotation to the shaft 5.

Immediately below the coupling plate 6 is a starting claw 9a or direction controlling means made in accordance with the principle of this invention. The starting claw 9a is made of nonmagnetic material and is about 0.5 mm. in thickness, and in this embodiment, is of brass or polycarbonate plastic. The coupling plate and the starting claw are two essential components in this invention. Their function and operation will be described in detail hereinafter.

In FIG. 1, the lowermost member is rotor 4 of the synchronous motor of this invention, and the rotor 4 is made of an axially magnetized permanent disc magnet having a pair of pole plates 4a and 4b of cold rolled steel or the like clamped to opposite sides of a magnet 3 as clearly shown in FIG. 2. Each of the pole plates of the rotor is provided with fifteen subpoles of notched form on the periphery thereof, and the total number of subpoles of the two plates is thirty subpoles in all. In addition, the ends of each pair of opposed subpoles are in staggered relation, being offset about 1/100 (one-hundredth) to 3/4 (three-fourths) of the width of the end of a subpole as shown in FIGS. 1 and 15, which is one of the features of the rotor of this invention. It has been found that the rotor can rotate with staggered ends of opposed subpoles, but cannot do so at all if they are in complete register with each other.

The maerial of permanent magnet 3 can be barium ferrite, Alnico steel, cobalt steel or the like, and in this embodiment a material having 140 gauss of magnetic induction is used. This is illustrative only.

The diameter of rotor 4 should be smaller than the inside diameter of the circle made by the groups of subpoles 2a and 2b so it can be housed in a cylindrical space and rotate freely therein. It is to be noted that the rotor 4 has no fixed shaft in the central aperture thereof, and the rotating shaft 5 is freely rotatable therein.

As clearly shown in FIG. 1, the starting claw or direction controlling means 9a and the coupling plate 6 in accordance with the principle of the invention are provided in the space between the rotor and the stator. Therefore, they are invisible when the motor of this invention is assembled as shown in FIG. 3, but they are depicted as visible in the drawing for convenience.

On energization of the field coil 1 of the motor of this invention, a magnetic pole of low intensity develops at each long subpole 2a of the stator and a magnetic pole of high intensity at each short subpole 2b. At the same time, the staggered subpoles 4a and 4b of the rotor in close proximity with the subpoles of the stator are influenced by the subpoles of high intensity of the stator to effect rotation of the rotor.

In the preferred embodiment of this invention, three forms of the starting claw or direction controlling means which functions to rotate the rotor in a desired direction are shown in FIG. 1 and FIGS. 4-5, respectively, which will be described hereinbelow.

The starting claw or direction controlling means 9a shown in FIG. 1 has a bifurcated end 17 which engages with a pin or protuberance 12 provided on the surface of one pole plate of the rotor 4. Further, the claw 9a has an aperture 18 which engages with a pin or protuberance 7 secured to one side of the coupling plate 6.

FIG. 6 is a sectional view showing the mounting and engagement of coupling 6, claw 9a and rotor 4, and FIGS. 7-8 show their operation. The material and thickness of the coupling plate and claw have been described hereinbefore.

The coupling plate 6 has the firmly fixed shaft 5 at the central aperture, and has a guide slot 13 in which the pin 12 attached to the rotor 4 is engaged. The pin 12 can move in the guide slot 13. The claw 9a has the aperture 18 in which the pin 7 fixed to the coupling plate 6 is pivotally mounted. Further, the claw 9a has the bifurcated end 17 in the recess of which the pin 12 is rotatably engaged through the guide slot 13. At this time, the pin 12 on the rotor 4 slides to the right side in the guide slot 13 as seen in FIG. 7, and the claw 9a swings around the pin 7 as a fulcrum. Hence, the other end of claw 9a assumes a right position by the guide of the pin 12, so the shaft 5 moves in rotation because it is secured to the coupling plate 6.

As is known, the rotor of a synchronous motor rotates in either direction, so the rotor can swing for a moment in either direction after energization of the field coil. However, the starting claw or direction controlling means of this invention immediately works to effect rotation in a desired direction instead of an opposite direction. Rotation of the rotor in the desired clockwise direction causes the coupling plate to move through the pin 12, then move the shaft 5 fixed to the coupling plate, and then rotate the shaft 5 to transmit its rotation to a load outside the rotor.

If the rotor 4 rotates in an opposite direction to the desired or clockwise direction in this embodiment, the pin 12 of rotor 4 slides to the left end of the guide slot 13 as shown in FIG. 8, and hence the end of claw 9a will slide to the left to cause the other end to project upwardly into a space between the adjacent subpoles of the stator, whereby the rotor is blocked against rotation in the left or counterclockwise direction, the direction of the arrow in FIG. 8, but can rotate in the right or desired direction with the engagement of rotor 4, coupling plate 6 and claw 9a.

The operation of claw 9a can be reversed if the direction of mounting relative to the pin 7 is reversed, in other words, in an opposite direction to the one shown in FIGS. 7-8. Thus, the rotor 4 can rotate in the reverse direction to that described above. In other words, the direction of rotor rotation can be selected as desired if the direction of mounting the claw or direction controlling means is correctly selected.

Thus, in accordane with the invention, the direction of rotation of a fractional horsepower synchronous motor can be easily and quickly reversed, hence it is advantageous in the fabricating and manufacturing cost.

Next, a second embodiment of the claw will be described in connection with FIG. 4. The claw 9b is oblong and has bifurcated end 14 at one end. The material and thickness of claw 9b is similar to those of the claw 9a. The mounting of claw 9b is shown in FIGS. 9–11, respectively. The operation and function of claw 9b is almost the same as that of claw 9a. However, in the claw 9b its bifurcated recess 14 is not engaged with the pin 12 attached to rotor 4, but is engaged pivotally with the pin 7 secured to coupling plate 6, and further, the claw 9b is mounted on a pin 16 attached to the rotor. The pin 16 is additionally provided.

The shaft 5 secured to coupling plate 6 having the guide slot 13 is freely rotatable in the central aperture of rotor 4, and the rotor 4 is housed within the stator. The pin 12 of rotor 4 is slidable in the guide slot 13. The pin 7 attached to coupling plate 6 is engaged with the recess 14 of claw 9b which is pivotally mounted on pin 16 on the rotor 4.

On energization of the field coil 1, the rotor 4 can start in rotation in the direction of the arrow shown in FIG. 10. When the rotor 4 rotates, the pin 12 moves to the left end of the guide slot 13 of coupling plate 6, and the coupling plate and shaft will rotate in the clockwise direction together with the rotation of the rotor. At the same time, the engagement of pin 7 attached to the coupling plate in the recess 14 of the claw 9b will be loosened to guide the slot 14 upwardly to the right in FIG. 10. Then, the other end 15 of claw 9b moves down around the fulcrum 16, hence the end 15 will separate from the subpole of the stator and the rotor 4 will rotate in the clockwise direction smoothly.

If the rotor starts to rotate in an opposite direction to the desired direction, the pin 12 of rotor 4 slides to the right end of the guide slot 13 of the coupling plate 6 in FIG. 11. Then, the pin 7 of coupling plate 6 will guide the recess 14 in claw 9b to the left, hence the claw 9b swings around the fulcrum 16 to cause the end 15 to project outwardly to engage in a space between subpoles of the stator, whereby the rotation of rotor is blocked. Therefore, in this particular embodiment, it is assured that the rotor, coupling plate and shaft will rotate in the clockwise or desired direction.

It is understood that when the claw 9b is mounted in the opposite direction relative to the fulcrum 10 the same as the claw 9a, the rotation of rotor can be effected in a counterclockwise direction.

In reference to the claw 9c in the form of a wire shown in FIG. 5, the mounting and operation of claw 9c is almost the same as that of claw 9a. This wire is made of non-magnetic material about 0.5 mm. in diameter. One end of the wire is formed as a hook as shown in FIG. 5, and this hook end engages with the space between subpoles of stator in order to prevent the rotor from rotation.

The intermediate portion of wire claw 9c is wound around the pin 7 of coupling plate 6 one or two turns so as to be able to move freely, and the other end 11 of claw 9c remote from the hook is engaged with the pin 12 attached to the rotor. The pin 12 is freely slidable in the guide slot 13 of coupling plate 12.

The operation of wire claw 9c is similar to that of claw 9a in FIG. 1. The pin 12 of rotor 4 moves to the right end of the guide slot 13 (see FIG. 13), and wire claw 9c swings about the fulcrum 7. Then, the end 11 of claw 9c is at the right end of guide slot 13 together with the pin 12, hence the hook end of claw 9c is withdrawn inwardly and the rotor begins to rotate smoothly in the right direction.

If the rotor starts to rotate in an opposite direction, the pin 12 thereof moves to the left end of the guide slot 13, and the end 11 of claw 9c assumes that same left end position to cause the hook end of the claw 9c to project upwardly in order to engage it in the space between subpoles of stator, whereby the rotation of rotor in the left direction of the arrow in FIG. 14 is prevented. Thus the rotor will rotate in the right or desired direction.

When the direction of mounting the wire claw 9c is reversed relative to the fulcrum 10, the hook end and the end 11 are reversed. Thus, the rotation of rotor can be effected in either direction as desired.

As fully described in the foregoing, the starting claw or direction controlling means in accordance with the present invention is characterized in that it is of simple construction, rugged and durable, ideal for the miniaturization of the synchronous motor, and further, it is advantageous in that it is easy to manufacture and is particularly adapted for mass production owing to its very simple construction so that it can be fabricated at a very low cost.

The invention may be carried out in the specific ways than those herein set forth without departing from the spirit and essential characteristics of the invention, and the present embodiments are, therefore, to be considered in all respects as illustrative and not restrictive, and all changes coming within the meaning and scope of the appended claims are intended to be embraced therein.

What is claimed is as follows:

1. In a synchronous motor, the combination of: a stator consisting of a field coil having a pair of pole plates, each of said pole plates being provided with a number of finger-like subpoles extending from said plate and bent substantially perpendicular to the plane of said plate in the same direction, said finger-like subpoles of one plate being longer than those of the other plate, said longer and shorter subpoles of said pole plates being arranged in alternate succession, the number of said longer subpoles being the same as that of said shorter subpoles, a rotor consisting of an axially magnetized permanent disc magnet and a pair of pole plates having a number of subpoles spaced around the periphery thereof clamped to opposite sides of said disc magnet, the number of said subpoles of one plate of said rotor being the same as that of said subpoles of the other plate thereof, the total number of said subpoles of both plates of said stator being the same as that of said subpoles of both plates of said rotor, said rotor having a central aperture, a coupling plate provided between said stator and said rotor, a shaft secured to said coupling plate at the center thereof, said shaft being freely rotatable in the central aperture of said rotor, said coupling plate having a guide slot, a pin secured to said rotor and slidable in said guide slot, pivotally mounted direction controlling means having one end movable into and out of engagement with said stator pole pieces, the other end being operatively coupled to said rotor and coupling plate for rotation thereby into engagement with said pole pieces when said rotor rotates in one direction and out of engagement when said rotor rotates in the opposite direction.

2. The combination as claimed in claim 1 in which said direction controlling means is a plate having said other end bifurcated, said plate being pivotally mounted on said coupling plate, said pin on said rotor extending through said bifurcated end of said plate.

3. The combination as claimed in claim 2 in which said plate is in the form of a crank lever.

4. The combination as claimed in claim 1 in which said direction controlling means is a bent up wire having said other end bent in a loop, said wire being pivotally mounted on said coupling plate, said pin on said rotor extending through said loop on said other end of said wire.

5. The combination as claimed in claim 1 in which said direction controlling means is a plate having said other end bifurcated, said plate being pivotally mounted on said rotor, and a pin on said coupling plate engaged in the bifurcated end of said plate.

6. The combination as claimed in claim 5 in which said plate is oblong.

7. The combination as claimed in claim 1 in which the ends of each pair of opposed subpoles of said pole plates of said rotor are offset from each other in an amount of from one-hundredth to three-fourths of the width of said end.

8. The combination as claimed in claim 1 in which the number of said longer finger-like subpoles of one pole plate of said stator is fifteen and the number of said shorter finger-like subpoles of the other pole plate of said stator is fifteen, said one pole plate of said rotor having fifteen subpoles and said other pole plate of said rotor having fifteen subpoles.

References Cited
UNITED STATES PATENTS

| | | | |
|---|---|---|---|
| 2,044,423 | 6/1936 | Dorer et al. | 310—164 X |
| 2,541,830 | 2/1951 | Phaneuf | 310—164 |
| 2,951,957 | 9/1960 | Eigeman | 310—164 |
| 3,259,771 | 7/1966 | Rubin | 310—164 |

MILTON O. HIRSHFIELD, *Primary Examiner.*

WARREN E. RAY, *Assistant Examiner.*